UNITED STATES PATENT OFFICE.

LYDIA A. FORD, OF KANSAS CITY, KANSAS.

MEDICAL COMPOUND FOR AGUE.

SPECIFICATION forming part of Letters Patent No. 248,727, dated October 25, 1881.

Application filed June 21, 1881. (No specimens.)

*To all whom it may concern:*

Be it known that I, LYDIA A. FORD, a citizen of the United States, residing at Kansas City, county of Wyandotte, and State of Kansas, have invented certain new and useful Improvements in Medicine for Cure of Ague; and I do hereby declare the following is a full description of the ingredients and mode of compounding the same.

Take four ounces of wild-cherry bark, three ounces of sulphur, and one quart of strong beer or ale. After properly mixing the ingredients, let them stand for four days, when they will be ready for use.

The mixture should be kept in a cool place and tightly corked.

Give a dose of half a wine-glass twice a day, before eating, morning and evening, in the absence of fever.

What I claim as my invention, and desire to secure by Letters Patent, is—

A medicine for cure of ague, composed of wild-cherry bark, sulphur, and strong beer or ale, in about the proportions and for the purposes hereinbefore set forth and described.

In testimony whereof I have affixed my signature in presence of two witnesses.

LYDIA A. FORD.

Witnesses:
G. W. FORD,
HENRY HULL.